United States Patent [19]

Beresinsky

[11] Patent Number: 4,720,005
[45] Date of Patent: Jan. 19, 1988

[54] MATERIAL CONVEYOR AND DISTRIBUTION SYSTEM

[75] Inventor: Isaac Beresinsky, Haifa, Israel

[73] Assignee: Moledeth Know-How Export Company (1978) Ltd., Haifa, Israel

[21] Appl. No.: 832,242

[22] Filed: Feb. 24, 1986

[30] Foreign Application Priority Data

Mar. 5, 1985 [IL] Israel .................................. 74503

[51] Int. Cl.⁴ .............................................. B65G 47/46
[52] U.S. Cl. .................................... 198/370; 198/817
[58] Field of Search ............... 198/370, 366, 369, 839, 198/817, 626, 627, 819, 823, 826

[56] References Cited

U.S. PATENT DOCUMENTS

| | | | |
|---|---|---|---|
| 772,968 | 10/1904 | Smith | 198/826 |
| 1,405,233 | 1/1922 | Lemoine | 198/817 |
| 3,661,244 | 5/1972 | Koyama | 198/819 |
| 4,289,230 | 9/1981 | McGee | 198/811 |

FOREIGN PATENT DOCUMENTS

| | | | |
|---|---|---|---|
| 1016190 | 9/1957 | Fed. Rep. of Germany | 198/819 |
| 968407 | 2/1958 | Fed. Rep. of Germany | 198/826 |

Primary Examiner—Joseph E. Valenza
Assistant Examiner—Cheryl Lynn Gastineau
Attorney, Agent, or Firm—Browdy and Neimark

[57] ABSTRACT

A materials conveyor and distribution system comprising a pair of juxtaposed component belts forming a composite conveyor belt having a conveyor stretch and a return stretch, adjacent longitudinal edges of the component belts being disposed in a substantially abutting relationship, at least in the conveyor stretch, a support for the component belts with their adjacent longitudinal edges in abutting relationship while allowing for the free movement of the belts with respect to the support, into and out of the conveyor stretch, one or more discharge locations along the conveyor stretch wherein the adjacent edges of the component belts can move apart so as to form a discharge gap, and apparatus for driving the composite conveyor belt into and out of the conveyor stretch.

12 Claims, 8 Drawing Figures

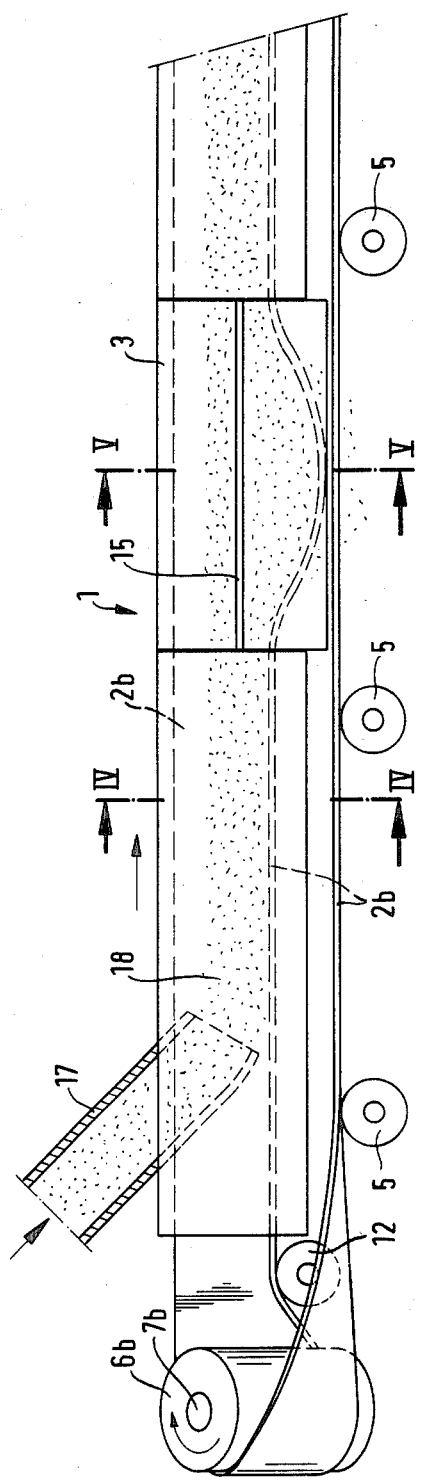
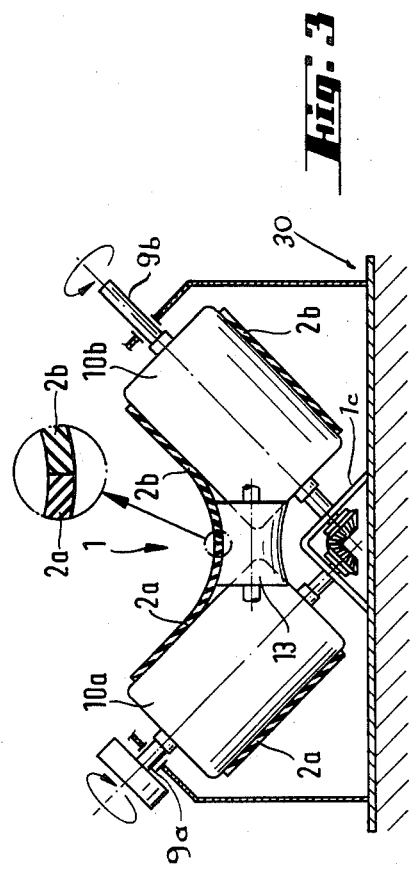

MATERIAL CONVEYOR AND DISTRIBUTION SYSTEM

The present invention relates to a materials conveyor and distribution system for conveying and discharging, at predetermined discharge locations, materials whether bulk materials such as grain or the like or discrete articles such as packages or the like.

Various materials conveyor systems are known. In one such system the material is introduced into a stationary casing and is moved along the casing by moving chains, paddles, screw flights or other suitable mechanical devices. The casing is provided at one or more predetermined locations with discharge openings which can be opened or closed as desired. Thus when one of such discharge openings is opened the conveyed material will be discharged therethrough. Clearly the opening and closing of such discharge openings can be remotely controlled and the conveyor system as a whole can be completely enclosed thereby avoiding, or at least substantially reducing, dust contamination.

However the movement of the conveyed material along such a stationary casing is accompanied by substantial wear and tear and involves relatively high energy consumption. Furthermore the rate of conveying of the material is limited.

In a modification of such known conveyor systems the casing can be disposed at a slight slope and the material itself can be subjected to fluidization. Discharge of the material at predetermined discharge locations can be effected, as before, by the provision of suitable discharge gates in the casing.

Whilst, with such a modification, the degree of wear is somewhat reduced, this system is expensive to produce and operate and is of relatively limited capacity.

In an alternative form of materials conveyor system an endless belt conveyor is employed. The belt is supported either on rollers or on a suitable support trough. The frictional resistance to movement of the belt with respect to the trough can be substantially reduced or almost eliminated by arranging for the belt to move on a thin air film or cushion.

With such belt conveyor systems the material can be conveyed at a relatively high speed (i.e. the speed of movement of the belt) and the operational costs and wear of the system are relatively low as compared with the stationary casing system referred to above. However the discharge of the material at predetermined locations along the path of the conveyor belt is relatively complicated. Thus, various mechanical discharge means have been employed such as for example, ploughs on flat conveyor belts and so-called "trippers" or throw-off carriages on troughed belts. Such mechanical discharge devices can be located at predetermined fixed positions along the path of the conveyor belt or can be arranged to travel along the length of the conveyor belt so as to service a predetermined number of discharge locations.

The provision of such mechanical discharge devices is complicated, particularly in view of the rather bulky nature of the devices and the use of such devices does not lend itself readily to remote control. Furthermore the provision of such discharge devices renders difficult the total enclosure of the conveyor system, which enclosure is necessary or desirable so as to avoid or reduce dust and contamination.

It has furthermore been proposed (German Patent Specification No. 968,407) to form the endless conveyor belt of a materials conveyor system of a pair of juxtaposed component belts whose adjacent longitudinal edge portions overlap. The conveyor belt comprises a lower conveyor stretch and an upper return stretch, the latter being trough shaped with the sloping sides of the trough being supported by rollers and with the base of the trough, consisting of the overlapping edges of the component belts being supported by an endless support belt which also serves to press the overlapping edges into sealing contact. In use, the component belts, carrying the material to be conveyed, move together with the supporting belt and, at a predetermined discharge location, the supporting belt is diverted out of supporting and sealing contact with the component belts, and the edges of the latter, being no longer supported at this location move apart, creating a discharge gap through which the material is discharged over and around the displaced support belt. This prior proposal clearly involves the use of relatively bulky and complicated moving parts (e.g. two separate endless belts and their supports) together with a requirement for diverting one of the belts so as to create a discharge location. Furthermore the provision of two component belts whose edges overlap carries with it the disadvantage that the component belts will tend to ride up and over each other under the weight of the belts and the conveyed material and special means have to be provided so as to cope with this tendency.

It is an object of the present invention to provide a new and improved materials conveyor and distribution system wherein the above referred to disadvantages are substantially reduced or avoided.

According to the present invention there is provided a materials conveyor and distribution system comprising a pair of juxtaposed component belts forming together a composite conveyor belt having a conveyor stretch and a return stretch, adjacent longitudinal edges of said component belts being disposed in a substantially abutting relationship at least in the conveyor stretch, support means for supporting the component belts with their adjacent longitudinal edges in said relationship whilst allowing for the free movement of the belts with respect to said support means into and out of the conveyor stretch, one or more discharge locations along said conveyor stretch wherein the adjacent edges of said component belts can move apart so as to form a discharge gap, and drive means for driving said composite conveyor belt into and out of said conveyor stretch.

By virtue of the fact that the longitudinal adjacent edges substantially abut each other, the weight of the material acting on the juxtaposed belts presses the belt edges into a closer abutment and thus an effective seal between the edges is effected. Additionally, the above referred to tendency of the edges to ride up and over each other under the weight of the material is avoided.

The support means for supporting the component belts can be constituted by a support trough located along the length of the conveyor stretch there being preferably provided means for forming an air support cushion between the trough and the belts. Where such a trough is provided, one or more displaceable discharge gates can be formed therein at the or each discharge location.

Alternatively, the support means can be constituted by a succession of support rollers with one or more support rollers being displaceable into and out of their support position at the or each discharge location.

In a preferred embodiment of the present invention the conveyor stretch is located above the return stretch and belt deflector means such as roller pairs are provided at downstream and upstream ends of the conveyor stretch for respectively moving the component belts apart as they enter the return stretch and for moving them together as they enter the conveyor stretch. In this way it is ensured that, in the return stretch and below the discharge locations, the component belts are sufficiently separated so as to allow for the discharge therethrough of the conveyed material.

For a better understanding of the present invention and to show how the same may be carried out in practice reference will now be made to the accompanying in which:

FIG. 2 is a partially sectioned side elevation of the system shown in FIG. 1;

FIG. 3 is a cross-sectional view of the system shown in FIG. 1 taken along the line III—III;

Figure 1:
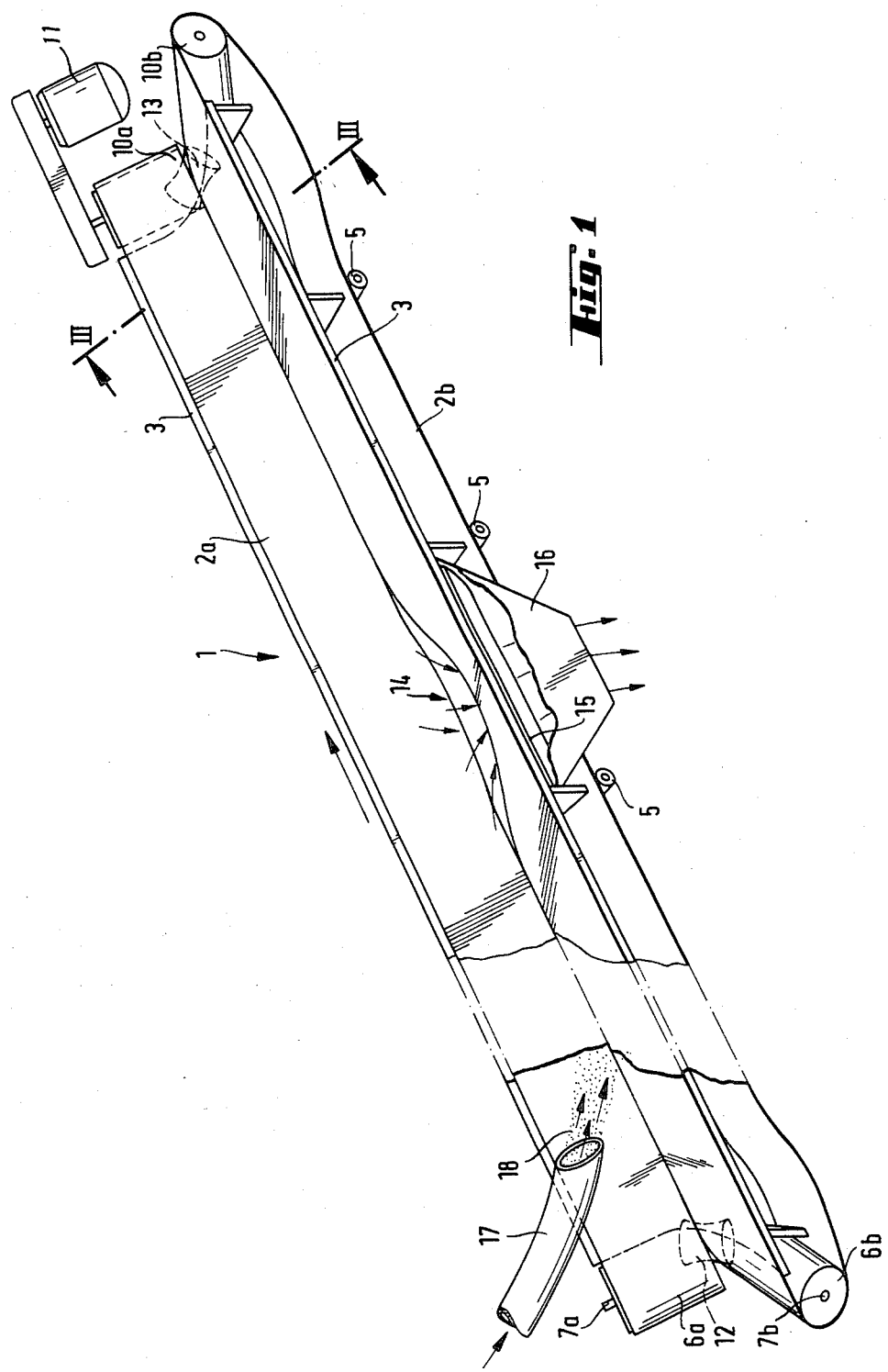
FIG. 1 is a schematic perspective view, from above, of a materials conveyor and distribution system in accordance with the invention.
Figure 4:
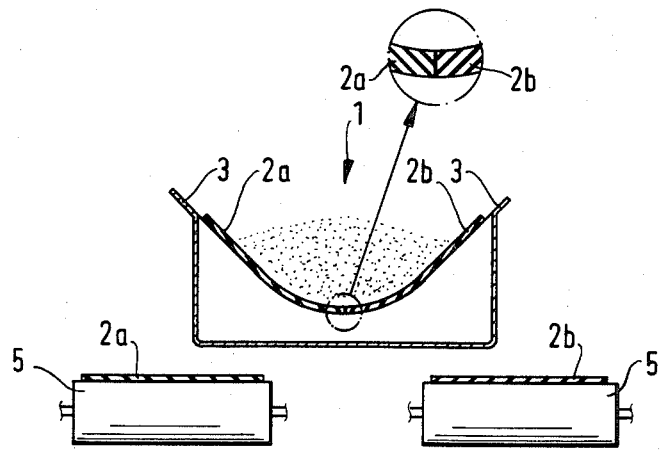
FIGS. 4 and 5 are respectively cross-sectional views of the system shown in FIG. 2 taken respectively along the lines IV—IV and V—V.
Figure 5:
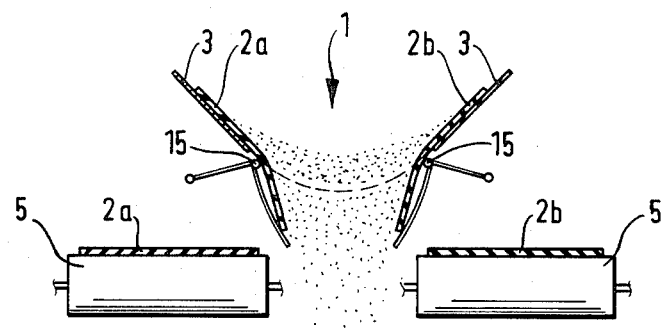

As seen in the drawings a materials conveyor and distribution system comprises a composite conveyor 1 consisting of a pair of component conveyor belts 2a and 2b. Each conveyor belt has a top conveying surface, upon which rests conveyed material, and non-conveying side surfaces which do not have conveyed material resting thereon and which extend transversely to the conveying surface along the longitudinal edges thereof. An upper, conveyor stretch of the composite conveyor belt 1 passes through and is supported by a support trough 3 which forms part of an air cushion support structure. The lower, return stretch of the composite conveyor belt is supported by successive sets of support rollers 5.

In the conveyor stretch and particularly when passing through the support structure the juxtaposed side surfaces of the component belts 2a and 2b are disposed in a substantially abutting relationship.

Located at the upstream end of the conveyor stretch is a pair of rollers 6a and 6b respectively mounted on axles 7a and 7b. The roller axles 7a and 7b are angularly disposed with respect to each other at an angle which conforms to the angle of the walls of the trough 3.

A similar roller arrangement 10a, 10b is located at the downstream end of the conveyor stretch the rollers being mounted on similarly angularly disposed axles 9a, 9b whose lower ends are journaled in a support bracket 10 centrally disposed in an enclosure 30.

The downstream rollers 10a, 10b are arranged to be driven by a drive means 11 so as to impart the necessary displacement to the composite conveyor belt.

A profiled pulley 12 is located in the path of the conveyor stretch between the roller pairs 6a and 6b and the upstream end of the support trough 3. A similar profiled pulley 13 is located between the downstream end of the support trough 3 and the downstream roller pair 10a, 10b.

As can be seen in the drawings the provision of the angularly disposed roller pairs 6a, 6b; 10a, 10b at the upstream and downstream ends of the conveyor stretch ensures that, as the composite belt passes out of the conveyor stretch and over and around the downstream roller pairs 10a, 10b, the component belts enter the return stretch spaced laterally apart. In this spaced apart condition they pass over the support rollers 5 until they pass over and around the upstream roller pair 6a, 6b and emerge therefrom so as to be displaced towards each other. In this condition they pass over the profiled pulley 12 which imparts to the juxtaposed belts the correct disposition for entering the trough 3. The component belts therefore enter and pass through the trough 3 with their side surfaces substantially abutting.

A discharge location 14 is formed in the trough 3 and support structure and, as shown in the drawings, the trough 3 at this location is provided with a pair of hinged discharge gates 15 which, when closed, form part of the belt support and, when opened, remove the support from the belts at the discharge location. Means (not shown) are provided for opening and closing the gates 15. In FIG. 1 of the drawings the discharge location is shown provided with a discharge chute 16.

A feed chute 17 is located adjacent the upstream end of the conveyor stretch from which, material 18 to be conveyed and discharged is fed onto the conveyor.

In operation, material 18 is fed onto the composite belt via the feed chute 17 and upon imparting of a suitable drive to the drive rollers 8a, 8b, the composite belt moves along the conveyor stretch carrying with it the material 18. In view of the fact that the adjacent side surfaces along the longitudinal edges of the component belts 2a, 2b substantially abut, these surfaces are in substantially sealing disposition and so the material is carried forward without significant leakage of material there between.

When it is desired to discharge the material at the discharge location 14 the discharge gates 15 are opened and, as a consequence, the abutting surfaces of the component belts passing through the discharge location are no longer supported and they separate, under the weight of the material so as to form a discharge gap through which the material is discharged via the chute 16. In view of the fact that the component belts passing through the lower return stretch are laterally displaced the discharged material can fall between the component belts in the return stretch.

As the component belts pass out of the discharge location they are once again supported at their surfaces which resume their abutting disposition.

By virtue of the fact that the adjacent side surfaces of the component belts abut, the downward forces exerted by the weight of the belts and by the weight of the material force the belts into the abutting disposition even more strongly thereby tending to increase the effective seal between the juxtaposed component belts. At the same time these forces will be balanced without the need for any external means for this purpose.

This effective seal can be enhanced by arranging for the juxtaposed surfaces of the component belts to be of slightly enlarged cross-sectional shape or to be relatively profiled so as to allow for one surface to nest within the other.

Whilst in the materials conveyor system just described with reference to FIGS. 1 through 5 of the drawings the conveyor stretch of the composite belt has been shown supported in, and sliding through, a sliding trough the latter can be supplemented by a suitable air cushion support system thereby substantially reducing wear and the frictional resistance to movement of the composite belt.

Figure 6:
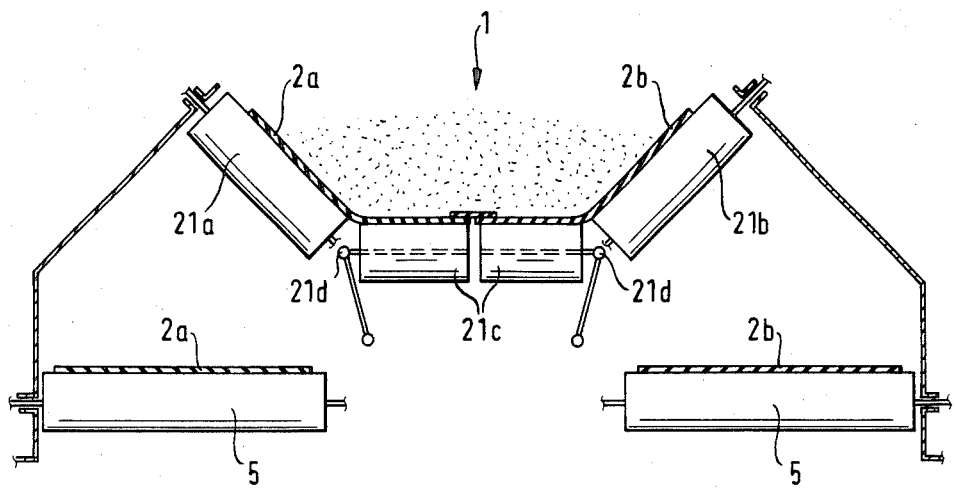
FIG. 6 is a cross-sectional view of a modified form of conveyor and distribution system wherein the conveyor stretch is supported by support rollers.
Figure 7:
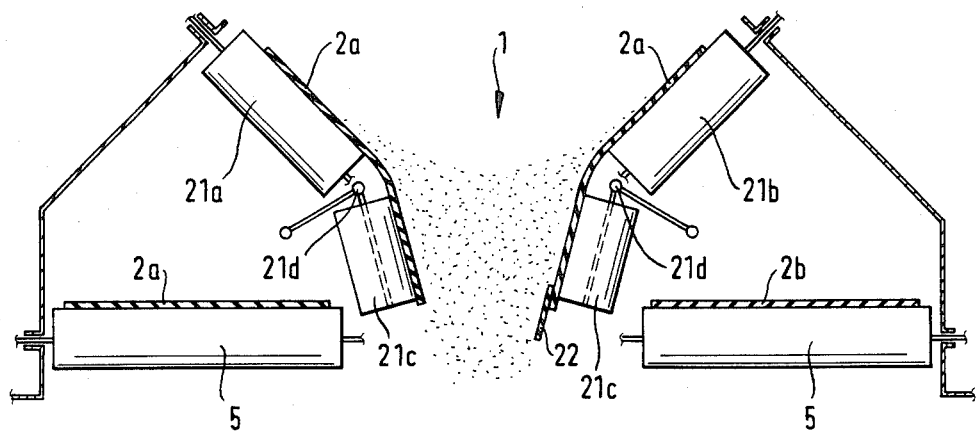
FIG. 7 is a cross-sectional view of the system shown in FIG. 6 at a discharge location.

In the system shown schematically in FIGS. 6 and 7 of the drawings the conveyor stretch of the composite belt is shown supported by a succession of support rollers 21. Two sets of support rollers 21a and 21b are shown respectively supporting the outer longitudinal sections of the component belts, these roller sets 21a and 21b being angularly disposed with respect to each other. A further central set of support rollers 21c, with horizontally disposed axes are shown supporting the inner horizontal base section of the composite belt including the juxtaposed abutting surfaces of the component belts.

At the, or each discharge location the centrally disposed support rollers 21c are provided with means 21d by which the rollers 21c can be moved into and out of their supporting position. Thus in FIG. 6 of the drawings the support rollers 21c in the discharge location are shown in their supporting position whilst in FIG. 7 of the drawings the support rollers 21c have been moved out of the support position. In the latter case the displacement of the support rollers 21c from their support position causes the juxtaposed longitudinal edges of the belts in the discharge location to move apart thus creating a discharge gap and the consequent discharge of the material therethrough.

In the embodiment shown in FIGS. 6 and 7 of the drawings one of the longitudinal edges is provided with an overlap strip 22 which, in the closed position of the discharge location, overlies the juxtaposed surface of the other component belt thereby increasing the sealing effect without in any way interfering with the effective abutting of the juxtaposed surfaces.

In the case of the roller supported conveyor stretch successive rollers 21c should be placed sufficiently close together so as to minimise any tendency of "sinking" of the sections of the component belts between rollers and consequent separation of the abutting surfaces.

Whilst in the embodiments described above the conveyor stretch of the composite belt has been shaped as a substantially curved trough, other trough shapes such as a substantially V-shaped trough can equally well be employed, in both cases however the angle of the trough should preferably be chosen so as to allow for the ready discharge of the material. Thus, for example, for relatively free flowing materials such as grain or the like the angle of slope of the sidewalls of the trough would be about 45 degrees whilst for non free-flowing materials this angle would be much higher.

Under certain circumstances, such as for example where the overall length of the discharge location is relatively limited, the belts, particularly in the region of their juxtaposed surfaces should be relatively flexible and elastic so as to allow for the ready deformation and opening of the juxtaposed surfaces under the weight of the material. For this purpose the component belts are suitably constructed so that whereas their outer longitudinal portions (not subjected to elastic deformation) are relatively rigid the inner longitudinal portions which, as indicated above should be readily deformable, are more elastic. Thus for this purpose the outer longitudinal portions which, as indicated above should be relatively rigid and of increased strength can be suitably reinforced by reinforcing plies whilst the inner longitudinal portions can be of a relatively elastic material.

Whilst in the arrangements described specifically above the upper stretch of the composite belt is the conveyor stretch whilst the lower stretch is the return stretch, the present invention is equally applicable to situations where the reverse is to be found, namely the lower stretch is the conveyor stretch and the upper stretch is the return stretch. In this case single horizontal end rollers could be employed. It will be appreciated however that, under these circumstances special arrangements have to be adopted for feeding the material to be conveyed onto the lower stretch. On the other hand, the means adopted in the specific embodiments described above for ensuring that the composite belts are laterally displaced in the lower stretch so as to allow for the effective discharge of the materials from the upper conveyor stretch through the laterally displaced component belts in the lower stretch, are no longer necessary.

Whilst in the embodiments described above the return belt stretch is shown and described as being supported on horizontally disposed rollers, the return belt stretch could be supported on a support trough with or without friction reducing air cushions.

Figure 8:
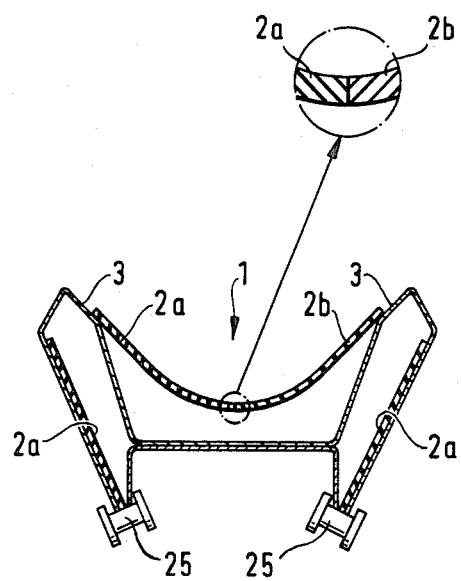
FIG. 8 is a schematic cross-sectional view of a modified form of conveyor and distribution system in accordance with the invention.

Furthermore, with a view to reducing the overall width of the conveyor system the return stretches can be supported on angularly disposed supports 25a and 25b as shown in FIG. 8 of the drawings with lowermost edges of the return stretches supported on rollers 26a and 26b.

Whilst in the embodiments specifically described above discharge locations have been described as being associated with gates or rollers which can be displaced, at will into and out of a supporting position it will be appreciated that fixed predetermined discharge locations can be provided by merely leaving more or less permanent gaps in the belt support structure at the regions where discharge is to be effected in which regions the component belts not being supported separate so as to produce the required discharge gaps.

I claim:

1. A materials conveyor and distribution system comprising a pair of juxtaposed component belts forming a composite conveyor belt having a conveyor stretch and a return stretch, each of said component belts having a conveying top surface and non-conveying side surfaces which extend transversely to said conveying top surface along the longitudinal edges thereof, adjacent side surfaces of said component belts being disposed in an abutting relationship and each of said component belts being angled upwardly from the horizontal, at least in the conveyor stretch, support means for supporting the component belts in a curved disposition with their adjacent side surfaces in said relationship whilst allowing for the free movement of the belts with respect to said support means, into and out of the conveyor stretch, one or more discharge locations along said conveyor stretch wherein the adjacent surfaces of said component belts can move apart so as to form a discharge gap, and drive means for driving said composite conveyor belt into and out of said conveyor stretch.

2. A system according to claim 1 wherein displacing means are associated with the, or each discharge location for displacing the support means at said location out of its belt supporting position.

3. A system according to claim 2 wherein said conveyor stretch is located above said return stretch and wherein belt deflector means are provided at downstream and upstream ends of said conveyor stretch for respectively moving said component belts apart as they enter the return stretch and for moving them together as they enter the conveyor stretch.

4. A system according to claim 3 wherein each belt deflector means comprises a pair of rollers mounted on angularly splayed apart axles, said component belts passing over the rollers of each pair, at least one of said roller pairs being driven.

5. A system according to claim 2 wherein said support means is constituted by a support trough.

6. A system according to claim 5 wherein a displaceable discharge gate is formed in said trough.

7. A system according to claim 2 wherein said support means is constituted by a succession of support rollers directly contacting and beneath said component belts, adjacent said abutting side surfaces.

8. A system according to claim 7 wherein one or more support rollers are displaceable into and out of their support position at the, or each discharge location.

9. A system according to claim 7 wherein said support rollers supports the component belts in the conveyor stretch in a trough configuration.

10. A system according to claim 1 wherein each component belt is formed of a pair of longitudinal regions one of which is of relatively increased elasticity as compared with the other.

11. A system according to claim 1 wherein the juxtaposed side surfaces of said component belts are of relatively enlarged cross-sectional area.

12. A conveyor system according to claim 1 wherein the return stretches of said component belts are supported on angularly disposed supports.

* * * * *